| United States Patent [19]
Goldkuhle

[11] Patent Number: 4,787,620
[45] Date of Patent: Nov. 29, 1988

[54] METHOD AND APPARATUS FOR CONTROLLING THE WITHDRAWAL OF ARTICLES

[75] Inventor: Gerhard Goldkuhle, Konstanz, Fed. Rep. of Germany

[73] Assignee: Licentia-Patent-Verwaltungs-GmbH, Fed. Rep. of Germany

[21] Appl. No.: 940,626

[22] Filed: Dec. 11, 1986

[30] Foreign Application Priority Data

Dec. 13, 1985 [DE] Fed. Rep. of Germany ....... 3544093

[51] Int. Cl.⁴ .................................. B65H 7/08
[52] U.S. Cl. .................................. 271/111; 209/555; 271/10
[58] Field of Search ............... 209/555; 271/110, 111, 271/265, 10

[56] References Cited
U.S. PATENT DOCUMENTS 3,981,493 9/1976 Klappenecker ............ 271/111
4,030,722 6/1977 Irvine et al. ............... 271/111
4,339,044 7/1982 Grosvernier .............. 209/555

Primary Examiner—Sherman D. Basinger
Assistant Examiner—Jesús D. Sotelo
Attorney, Agent, or Firm—McGlew and Tuttle

[57] ABSTRACT

A Method of Controlling the Withdrawal Process is carried out in a Singling Device and Arrangement to increase the throughput of singled shipments such a letters, postcards and the like from a singling device to a conveyor, the delivery of successive shipments from the singling device is controlled as a function of the measured parameters like length, height, thickness, stiffness, surface roughness, and weight of the shipment previously withdrawn from the singling device so that a minimum distance depending on the parameters of the preceding shipment can be adjusted between the withdrawn shipments on the conveyor. Thus, the singled, successive shipments can be offered to a distribution section, such as one equipped with directing switches and stacking compartments, via the conveyor, the minimum spacings between them and with the assurance of troublefree stacking of the shipment in the stacking compartments.

21 Claims, 8 Drawing Sheets

METHOD AND APPARATUS FOR CONTROLLING THE WITHDRAWAL OF ARTICLES

FIELD AND BACKGROUND OF THE INVENTION

This invention relates in general to article delivery mechanisms and in particular to a new and useful apparatus and method for controlling the withdrawal of shipments.

The invention improves the state of the art and provides a method and an arrangement for the successive delivery of singled shipments such as letters, postcards and the like differing in their lengths, heights, thicknesses, weights and stiffness from e.g. a stack to a conveyor to achieve the greatest possible throughput, i.e. to transport as great a number of singled letters as possible from a withdrawing device to a conveyor in a given time interval. This should assure troublefree, continuous operation in conjunction with a succeeding distribution section. As a result, the singled, successive shipments are offered to the succeeding distribution section with optimized, minimal, spacings over a conveyor in such a manner that a correctly timed control of the directing switches of the distribution section and smooth stacking of the letter shipments in compartments are assured.

SUMMARY AND OBJECT OF THE INVENTION

Accordingly, it's an object of the invention to provide a method and apparatus for controlling the withdrawal of articles from a singling device such as withdrawing letters from a stack of the letters and feeding them to a delivery station which comprises withdrawing the articles from the singling device in the direction of a gripping area of a conveyor and selecting between the article withdrawn immediately before the next article not yet withdrawn a distance which is determined as a function of the parameters of the withdrawn shipment or article based for example on the length, thickness, weight, stiffness, surface roughness and the like. The further object of the invention is to provide an arrangement of elements for carrying out the method of the invention. The arrangement includes a measuring device arranged along the path of feed of the articles which measures the parameters of the shipment last withdrawn and the distance between successive shipments as they are withdrawn; a signal processing device is provided connected to the measuring device which furnishes an output signal dependent on the parameters of the withdrawn shipment; the output signal represents a measure of the minimum distance to be selected between the shipment last withdrawn and shipment not yet withdrawn. A control unit is provided connected to the processing device for receiving the output signals of the signal processing device and generating a control signal. The control signal actuates a control signalling device when the distance between the previously withdrawn shipment and the shipment to be withdrawn coincides with a given distance to be selected.

A further object of the invention is to provide a device for controlling the withdrawal of articles of a singling device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

GENERAL DESCRIPTION OF THE PREFERRED EMBODIMENTS

Figure 1:
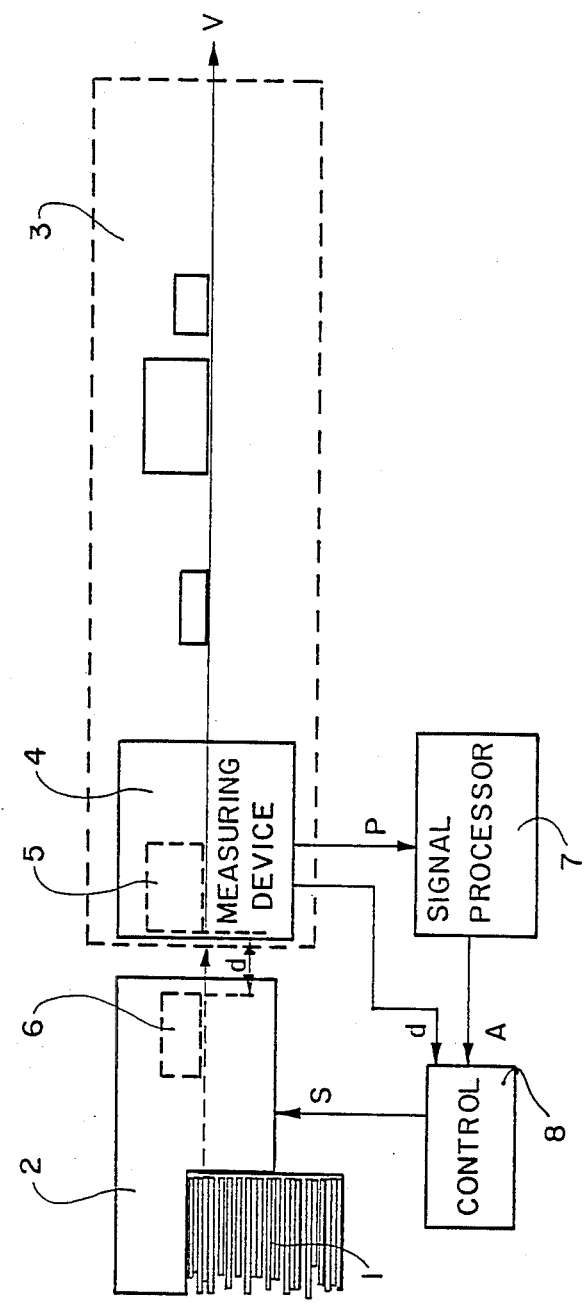
FIG. 1 is a schematic elevational view of a layout showing the principle of the control of a singling device.

Referring to the drawings in particular the invention embodied therein comprises a method of controlling the withdrawal of articles such as envelopes arranged in a stack 1 of a singling device 2 with a successive delivery of the articles which have different parameters such as length, thickness, weight, stiffness, surface roughness and the like. The withdrawal is effective in the embodiment shown with a conveyor 3 which has an entrance gripping area. The articles are withdrawn from the stack 1 by a withdrawal belt 31 and moved in the direction of the gripping area of the conveyor 3. A spacing is provided between the article withdrawn immediately before (last withdrawn) as indicated by the letter 5 and the article not yet withdrawn as indicated by the number 6. The distance of the spacing is determined as the function of the parameters of the withdrawn shipment.

In a singling device as described e.g. in DE-PS No. 27 58 007, shipments such as letters are brought from a stack to a withdrawal device, delivered from there individually and transported by means of a conveyor equipped with continuously driven conveyor rolls to a succeeding distribution section and then stacked, as a function of the position of the directing switches in front of the target compartments, in a target compartment coordinated in accordance with the destination of the letter.

The withdrawal device, interacting with the shipment nearest the withdrawal belt, pushes this frontmost shipment into the gripping range of the conveyor rolls due to a control signal which controls the brake clutch of a continuously running motor; thence, this shipment is transported to the distribution section at the given conveying speed v of the conveyor.

It has been a general rule to date that the greatest possible conveying density can be achieved by controlling the singling device according to a constant minimum gap between successive shipments. However, with regard to the mutual distances of the successive shipments on the conveyor and in the distribution section adjoining it, the mutual distances of successive shipments must not fall below a certain value; this minimum value depends both upon the slippage which may possibly occur on the conveyor and vary from shipment to shipment, and also in the presence of a subsequent distribution section, upon the reaction tolerance of the control of the switches and the respectively permissable stacking order (stacking behavior, of the individual shipments into the target compartments. Therefore, the optimal distance to be selected between successive shipment is not constant but variable. This means that a control to assure constant distances does not meet the requirement of maximally possible output.

To achieve this, the invention provides for acquiring the parameters of the previously withdrawn shipment relevant for the optimal distance and determining therefrom the associated optimal distance. In the meanwhile, this shipment is preferably gripped by the conveyor and transported further; the withdrawing device transports the next shipment in conveying direction only when the trailing edge of the preceding shipment has the given optimal distance from the leading edge of the succeeding shipment.

In the distribution section, the properties of the directing switches (reaction tolerance of the arrangement), conveyor belts, transport are preferably included in the distance maximization. Preferably, in order to find the minimum distance allowable between two successive shipments, the shipment-specific parameters are acquired on the one hand, and the equipment-specific parameters on the other.

Since it is only the preceding shipment which determines the minimally possible distance from the succeeding shipment, it is unnecessary to acquire differences between the shipment-specific parameters of two successive shipments, but only the parameters of the preceding shipment.

The parameters of the preceding shipment relevant for the determination of the minimally possible distance are, for instance, length, height, thickness, weight, stiffness surface roughness of the article, and the like.

For example, if the preceding shipment is very long, high, and very thin (air cushion), its stacking time into a compartment is very long as compared to a thick, stiff and short shipment, which means that in this case a relatively great gap should be selected so that the next shipment going into the same compartment will not interfere with the proper stacking of the preceding shipment and vice versa.

A very small gap may be selected for a preceding very short, stiff shipment. If the thickness of the preceding shipment is very great and if the succeeding shipment is steered into a different target compartment, the minimum selectable distance depends, for example, on how fast a switch in the distribution section may be repositioned.

According to the invention, the shipment parameters such as length, height, thickness and e.g. also stiffness of the individual shipments occurring in the singling device are determined, and the slippage occurring in the respective shipment type in the course of its transport as well as the associated stacking time in a target compartment and the switch repositioning time are coordinated therewith by earlier experimentation.

This results in an allowable minimum distance of the preceding shipment to the next shipment, determined by the greatest of the two time values—stacking time or switch repositioning tolerance—and transport velocity of the shipments.

FIG. 1 shows the principle of the control of a singling device 2.

A singling device 2 singles letters, e.g. from a stack 1. The withdrawal of shipments from a shipment stack, i.e. the time after which the next letter is withdrawn from the stack, is preferably made dependent upon the height, length, (format) and thickness of the preceding shipment.

When the withdrawal of the first letter is concluded, it is gripped by a conveyor 3 and transported at a constant speed v to the target location.

Disposed preferably in the gripping area of the conveyor 3 is the measuring device 4 which acquires the parameters P of the letters arriving on the conveyor 3 as required to determine the optimal distance or spacing.

A signal processing device 7 furnishes, from the input signals corresponding to the parameters P of the withdrawn letter, an output signal A which corresponds to the minimally possible theoretical distance from the next letter. A time-delayed trigger signal of a control unit 8 can then activate e.g. the clutch of a drive motor 30 for the withdrawal belts 31 of the singling device 2 when the distance d between the trailing edge of the withdrawn letter 5 and the leading edge of the not yet withdrawn letter 6 corresponds to the given theoretical value. The time delay may be determined, for example from the transport velocity v of the withdrawn letter 5 and the distance time curve between the trailing edge of the withdrawn letter 5 and the leading edge of the not yet withdrawn Letter 6.

Figure 2:
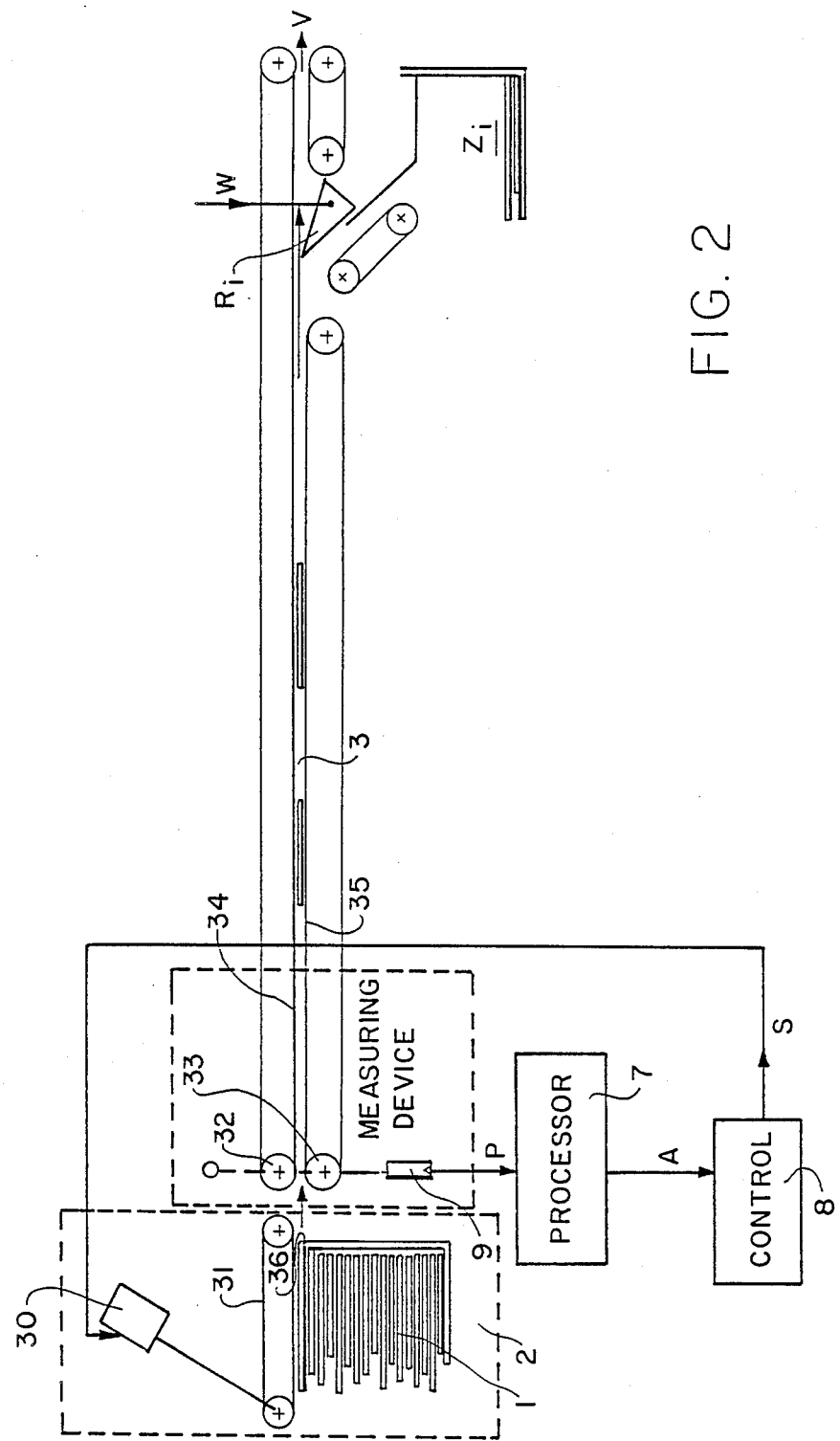
FIG. 2 is a schematic elevational view of the measuring device and of the controlled singling device constructed in accordance with the invention.

As an introduction, the basic principle of the measuring device 4 and of the control unit 8 for the execution of the method according to the invention are illustrated by way of a simplified example in FIGS. 1 and 2. Therein, it is assumed in simplification that two successive letters are identical, except for their length.

FIG. 2 shows a detailed view of a singling device 2, by means of which letters can be e.g. singled from a stack 1. In the singling device 2 it is always the first letter nearest the withdrawal belt 31 driven by a motor 30 which is gripped by the withdrawal belt 31 and thence withdrawn from the singling device 2 in the direction of the adjoining conveyor 3.

When this letter (FIG. 1) arrives in the gripping area of the conveyor 3, i.e. between the conveyor belts 36, 35 revolving around the deflection rolls 32, 33 it is transported to the adjoining distribution section 26. The next letter 6 preferably stays in the withdrawal device.

A light barrier 9, (FIG. 2) which furnishes a stop command to the singling device 2 (the brake of the brake clutch of motor 30 is activated) as long as the withdrawn letter 5 (FIG. 1) sets the light barrier 9 (FIG. 2) to "dark", is preferably disposed in the gripping area of the conveyor 3.

Therefore, the leading edge of the next letter 6 (FIG. 1) stays in the withdrawal device at the stop wall 36 (FIG. 2) e.g. until the trigger signal S (start signal) furnished by the control unit 8 activates the withdrawal device drive.

In the special case in which both letters are to be stacked in the same target compartment $Z_i$ (FIG. 2) of an adjoining distribution section 26 and the slippage difference is negligible (simplification), the stacking time required for this letter, i.e. the time the letter needs to be properly deposited in a target compartment $Z_i$ and after which the leading edge of the next letter may reach the area of the trailing edge of the stacked letter without hitting it during the stacking operation, is derived in this simple case from the length L of the preceding letter. The repositioning time and tolerance of the switches $R_i$ can be disregarded because no repositioning is required for the next letter.

From the knowledge of the stacking behavior of the previous letter—according to its length (simplified assumption for illustration: stacking behavior depending only on letter length)—it is possible to derive, in conjunction with the transport velocity v of the letters on the conveyor 3, the required minimum distance from the next letter.

The letter length L of the preceding letter is determined preferably by means of a measuring device 4 following the singling device 2. The light barrier 9 disposed in the gripping area of the conveyor 3 is preferably used for this purpose; a measure of the letter length L is obtained from the time interval during which the light barrier 9 shows dark and the given transport velocity v of the withdrawn letter on the conveyor 3.

This output signal is preferably fed to a signal processing device 7 which furnishes a trigger signal to the control unit 8 after a time resulting as a function of the length of the previously withdrawn letter, thus supplying to the singling device 2 a starting signal S which effects the transport of the next letter located in the withdrawal area to the gripping area of the conveyor 3. This is the case whenever the distance d (FIG. 1) between the letter transported on the conveyor 3 and the next letter in the singling device 2 coincides with the distance prescribed by the signal processing device 7. In the event of coincidence the signal processing circuit 7 generates from the comparison of the theoretical value for the distance resulting from the letter length with the momentary distance a trigger signal A which is fed to the control unit 8.

Figure 3A:
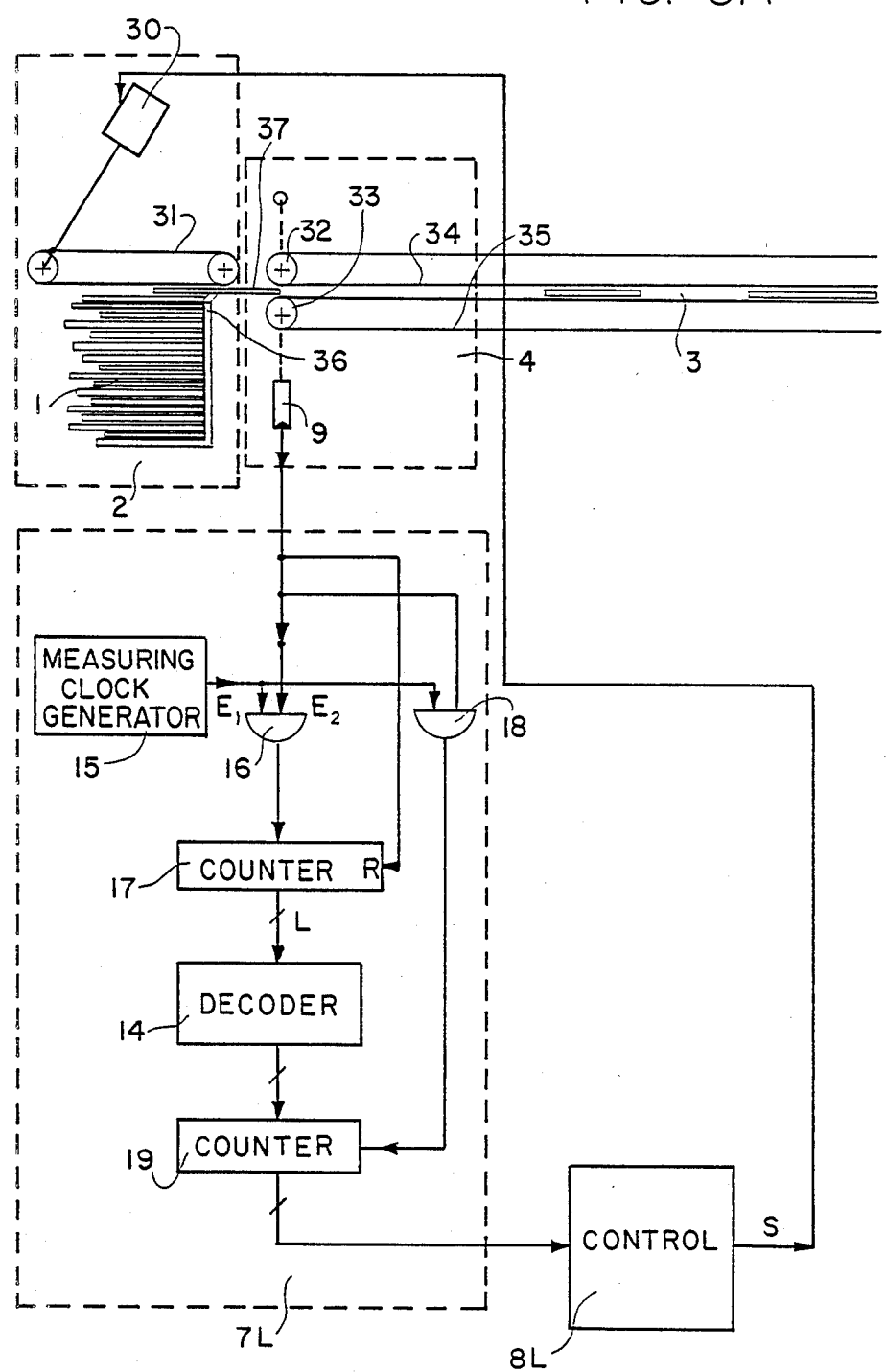
FIG. 3A is a schematic layout of a signal processing device for length measurement and distance control.

A suitable signal processing device 7L for this special case (length parameter only taken into account) in connection with an advantageous measuring device 4 solution is shown in FIG. 3A.

The preceding letter 37 switches the light barrier 9 to dark when its leading edge enters the light barrier area. A measuring clock generator 15 furnishes, within the dark position of the light barrier 9, an appropriate number of pulses which are preferably counted by means of a counter 17. The number of pulses corresponds to the length L of the shipment at a given transport velocity v of the letter. The counter 17 is preferably set to zero when the light barrier 9 is darkened. The AND gate 16 has the effect of causing the measuring clock generator 15 to make the length counter 17 count up during the dark position of the light barrier 9.

The input of a decoder 14, e.g. designed in the form of a ROM, is preferably connected to the output of the counter 17 (e.g. with an n-bit output; with n=5). The decoder 17 contains preferably a chart in which a distance value (theoretical value) is assigned to each address value applied, i.e. letter length L. The given distance value, depending on the letter length L, is applied in advantageous manner to the data output of the ROM. Another counter 19, used to measure the distance, is preset with this output value.

The theoretical distance value is preferably reduced by the distance of the trailing edge of the withdrawn letter from the leading edge of the not yet withdrawn letter at the time the light barrier 9 switches from dark to light. This distance depends on the relative location of the conveyor to the singling device, thus being an equipment-specific constant. The start of the counter 19, preferably a down-counter 19, is initiated with the trailing edge of the shipment by the dark/light position of the light barrier 9 and counted down by the measuring clock generator signals 15. When the shipment leaves the light barrier, and AND gate 18 causes the down counter 19, which is preset by the ROM-outlet 14, to be count down in response to the measuring clock generator 15.

Therefore, the momentary output of this downcounter 19 corresponds to the theoretical value minus the momentary distance between the trailing edge of the preceding letter from the leading edge of the letter not yet completely withdrawn, such as the letter whose leading edge is in readiness at the stop wall 36.

If the output value is zero—theoretical and actual distance values coincide—the succeeding control unit 8L, e.g. containing a comparator unit $K_1$, initiates an output signal S, e.g. "HIGH", which drives the withdrawal belt 31 of the singling device 2 again (activation of the brake clutch.

If the output signal of the comparator unit $I_1$ is "zero" or e.g. "LOW", the withdrawal belt 31 is not being moved (standstill).

For the withdrawn letter to be gripped by the conveyor 3 as definitely as possible, this light barrier 9 should be disposed in the gripping area of the conveyor.

Figure 3B:
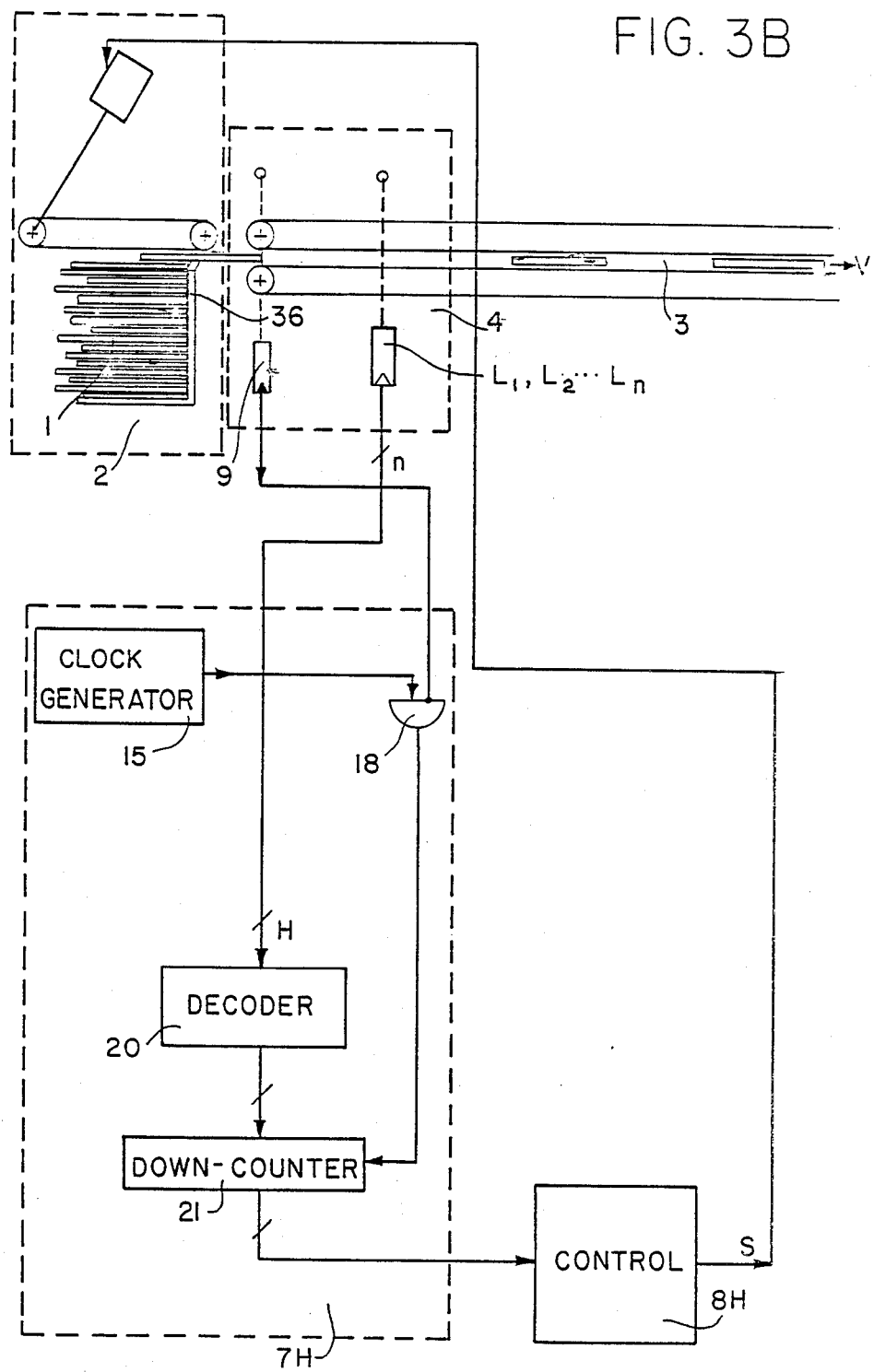
FIG. 3B is a similar view of a height measurement control.

FIG. 3B shows a device to measure the height H of a letter with the associated signal processing device 7H.

It is preferred to dispose for the acquisition of the letter height H a bank of light barriers $L_1, L_2 \ldots L_n$ mounted perpendicular to the conveying direction in the gripping area of the conveyor 3. The number n of light barriers used should correspond to the measuring accuracy required.

The outputs of the light barriers $L_1, L_2 \ldots L_n$ are advantageously connected directly to the address inputs of a decoder 20, such as a ROM. The ROM furnishes a bit pattern corresponding to the (theoretical) distance value to be maintained from the next letter as dictated by the letter height. This value presets a succeeding down-counter 21. When the trailing edge of the shipment clears the light barrier 9, the AND gate 18 switches the measuring clock generator 15 through to the downcounter 21. This is the light position.

This preset value is preferably reduced by the distance between the leading edge of the not yet withdrawn letter (corresponding to stack wall 36) and the trailing edge of the withdrawn letter or the light barrier 9 (see also signal processing for length-dependent theoretical distance value).

The downcounter 21 is also preferably initiated by the dark-light control of the light barrier 9 on the basis of the trailing edge of the letter transported by the conveyor.

The momentary output value of this counter 21 corresponds to the theoretical value less the momentary distance d between the preceding and the next, not yet withdrawn letter.

If the count of the downcounter 21 is zero, a succeeding control unit 8H containing another comparator unit $K_2$ furnishes a "HIGH" control signal. The control signals generated by the length and height measurement of the shipment are preferably fed to an AND circuit, and the output signal S of this AND circuit is used to activate the brake clutch of the singling device.

Figure 3C:
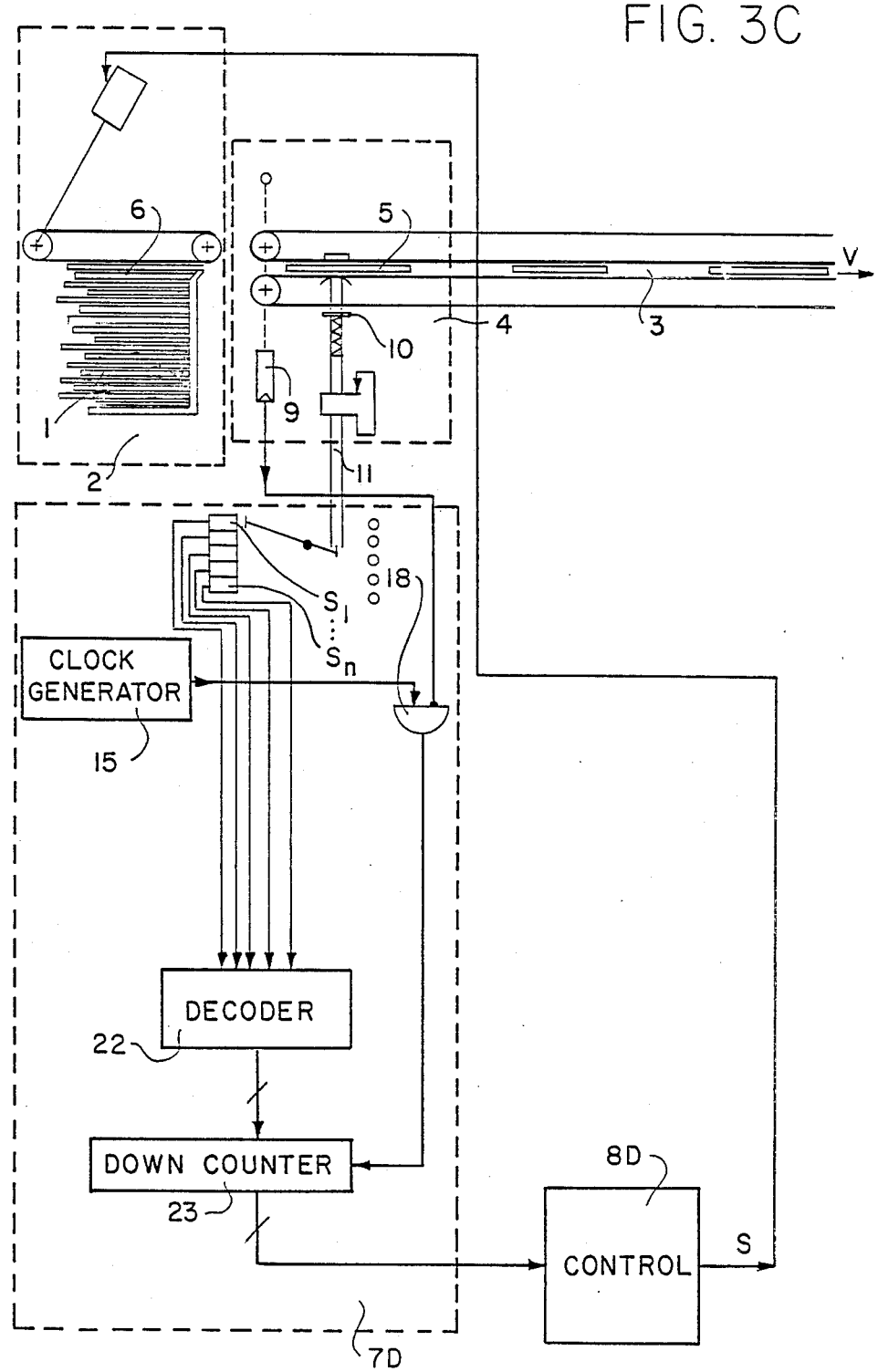
FIG. 3C is a similar view of thickness measurement control.

FIG. 3C shows the case of a thickness measurement and the circuit arrangement of the control of the theoretical distance value resulting therefrom, corresponding to the previous examples (decoder 22 and downcounter 23 as well as control unit 8D). The thickness is measured, for example, by means of an angle of rotation indicator 10 which contains a spring loaded plunger 11 which moves within a bank of light barriers $S_1, S_2 \ldots S_n$ as a function of the prevailing letter thickness D. The downcounter 23 is preset by the measurement of the thickness over the ROM 22 in such a way that, after the measuring clock generator 15 has been switched in, it provides a gap or lag for the subsequent shipment through the AND gate 18. The thickness D is obtained, for example, from the dark position of the specific light barrier.

Other shipment parameters determining the distance d to be selected between two successive shipments such as weight and surface roughness, can be acquired in accordance with the previous examples. This may be used to derive, by means of the signal processing device 7 preferably containing other decoders, the time at which to withdraw the next shipment located in the withdrawal area of the singling device 2. Selected is the worst case, i.e. the minimum allowable distance resulting from the individual shipment parameters P (corresponding to the maximum output value of one of the decoders).

Figure 4:
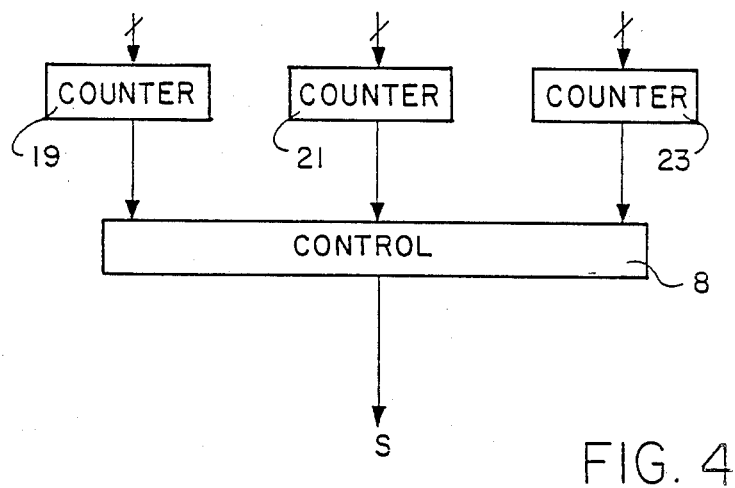
FIG. 4 is a similar view of a control logic control.

Employed in advantageous manner for this purpose is an AND circuit 24 located in the control unit 8 (FIG. 4) on the output side whose inputs are connected directly to the outputs of the individual signal processing devices 7L, 7M, 7D. Only if all output counters 19, 21, 23 are at zero does the control unit 8 furnish through its AND circuit at its output the control signal S to drive the withdrawal belt (see FIG. 4).

Figure 5:
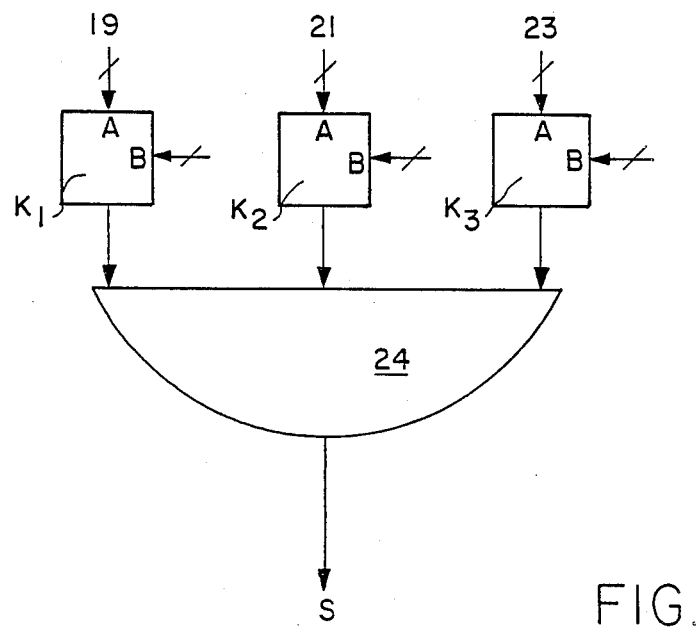
FIG. 5 is a circuit arrangement of a withdrawal control.

FIG. 5 shows an advantageous arrangement of a control unit 8 for the case in which several, three in the case of the example, shipment parameters (height, length, thickness, for example) are acquired by the measuring device 4 and the results fed to the control unit 8 via the associated signal processing devices 7L, 7H, 7D. This circuit arrangement is suited in particular for finely optimizing the distances between successive letters.

In a purposefully expanded embodiment, the various parameters can be combined in such a manner that, for example, a long, stiff, preceding shipment permits a shorter gap between it and the next shipment than a long, soft one.

Preferably, the control unit 8 contains comparators $K_1, K_2, K_3$ on the input side Their output signals are "HIGH" if all associated outputs of the parameter-specific downcounters 19, 21, 23 which are connected to the A inputs of the appropriate comparators $K_1, K_2, K_3$, are on "zero"; in this special case, the B inputs are also on "zero".

In FIG. 5, the AND circuit furnishes the control signal S to drive the withdrawal belt when the output signal of the AND circuit is "HIGH".

Figure 6A:
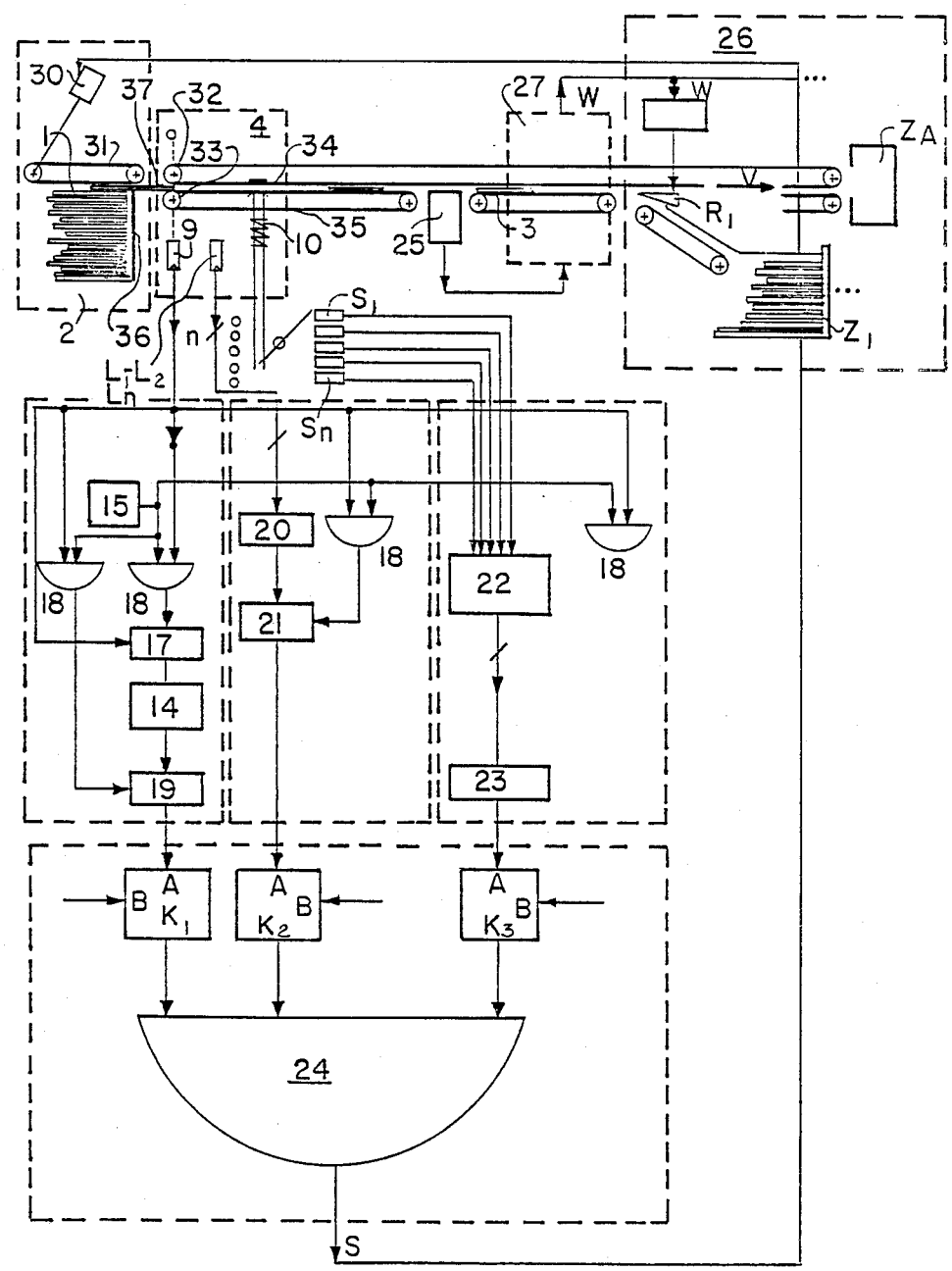
FIG. 6A is an overall schematic view of a singling device with target recognition device and distribution section.

FIG. 6A shows a further development of the solution according to the invention. In order to be able to check equipment-specific variations, especially variations in the withdrawal and transport operations occurring during the warmup of the machine, thereby preventing possible malfunctions, there is provided, preferably ahead of a distribution system 26 in which the arriving letters are stacked in the appropriate target compartments $Z_i$ by directing switches $R_1, R_2 \ldots R_n$, a checking and measuring device 27 which acquires essentially the same parameters P of the individual letters, like e.g. length, height, thickness and determines the distances between the successive letters.

The checking and measuring device 27 preferably acquires the letter parameters in the same manner as the measuring device 4 and also contains a signal processing device and a control unit. This makes a verification possible in simple manner, especially of the deviation of the theoretical from the actual distances between letters.

In case the distance d between two successive letters has become too small as both are to be stacked in the same target compartment $Z_i$, for instance, this disturbing condition can be avoided if the trailing letter can be directed into a catch compartment $Z_A$. A prerequisite for this is an adequately fast working control of the directing switches $R_1, R_2 \ldots R_n$.

Furthermore, if a shipment is thick, for instance, a supplemental value can be added to the target information for this shipment to delay the time at which a switch is switched when the shipment leaves this switch.

For this reason, an additional distance measurement d, which may operate in accordance with the length measurement, for example, must be carried out with the checking and measuring device 27; the start signal for the distance measurement is then initiated in advantageous manner by the trailing edge of the letter, i.e. by a dark/light activation of a light barrier. According to the number of clock generator signals appearing, a counter will run to a value, e.g. within the light phase of the light barrier, which corresponds to the distance between two successive letters. If the measured distance does not coincide with the (theoretical) distance resulting from the parameters of the letters within a given tolerance, i.e. if it is too short, a comparator advantageously installed in the checking and measuring device 27 for this purpose will furnish a control signal W to switch the switch $R_1$, preferably at a time when the preceding letter has passed the switch so that the next letter is deposited in the catch compartment $Z_A$. This is shown schematically in FIG. 6A for the simple case of a target compartment $Z_A$ and a catch compartment $Z_1$ with a directing switch $R_1$.

If, as is normal, there are several target compartments in the distribution section, e.g. in series, the directing switches $R_1, R_2 \ldots R_n$ must be controlled accordingly, depending on the destination of the letter, to stack the letter in the correct target compartment $Z_i$. Determining the destination and controlling the switches $R_1, R_2 \ldots R_n$ is preferably performed by a target recognition device 25.

Figure 6B:
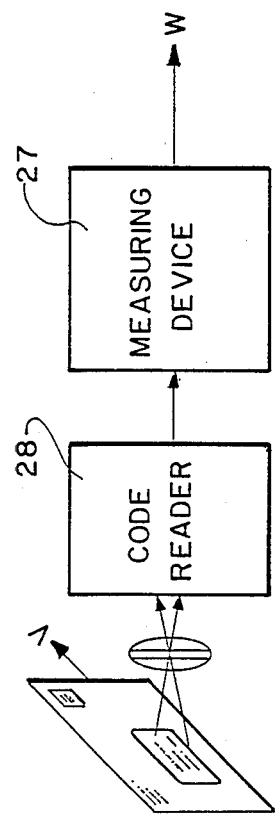
FIG. 6B is a view similar to FIG. 6A of a bar code reader.

The target recognition device 25 acquires the destination of the letter, preferably after the measuring device 4. It is preferred to use for this purpose a bar code reader 28 (see FIG. 6B) which controls the directing switches $R_1, R_2 \ldots R_o$ by means of its output signals and informs the checking and measuring device 27 on whether or not successive shipments are to be directed to one and the same target compartment.

Under the assumption that the switch switching time is so short that the minimum distance between successive letters does not depend on it and that the target compartments of successive letters are not the same, the successive letters may very well be moved into the distribution section with a shorter distance than the theoretical distance prescribed by the measuring device without a malfunction having to be feared.

It is possible with this solution according to the invention to increase the throughput of letters on the conveyor 3 considerably at constant transport velocity v; especially if the mix of shipments contains very short shipments. Throughput increases of more than 20% are achievable with the singling device 2 in conjunction with distribution sections.

In singling devices in conjunction with distribution sections it is usually the stacking method which determines the maximally allowable distance between successive shipments, if the successive shipments must be steered into the same target compartment $Z_i$.

If the successive shipments are not steered into the same target compartment $Z_i$ it is essentially the type of directing switch $R_1$ (model, switching speed and tolerances) which determines the minimum allowable distances between successive shipments.

Since the mechanical stress on the shipments makes a higher throughput through increasing the transport velocity v possible only to a limited degree, the efficiency of letter distributing machines can be improved substantially by the solution according to the invention.

While specific embodiments of the invention have been shown and described in detail to illustrate the application of the principles of the invention, it will be understood that the invention may be embodied otherwise without departing from such principles.

What is claimed is:

1. A method of controlling the withdrawal of articles from a stack of articles in a singling device, each withdrawn article having a length, thickness, weight, stiffness and surface roughness, the withdrawn article engaging a gripping area of a conveyor having an entrance grippng area, comprising the steps of: withdrawing a first article from the stack of articles in the singling device in the direction of the gripping area of the conveyor; and, selecting a distance between the article last withdrawn and an article not yet withdrawn, based on the length, thickness, weight, stiffness and surface roughness of the article last withdrawn.

2. A method according to claim 1, further comprising: allowing the gripping area of the conveyor to engage the article withdrawn; moving the article withdrawn past a measuring device; masuring the length, thickness, weight, stiffness and surface roughness of the article withdrawn using the measuring device to produce measurement signals; receiving said measurement signals in a signal processor and generating a signal to withdraw a subsequent article.

3. An arrangement for controlling the withdrawal of articles from a stack of articles comprising a: a singling device having means for feeding the articles one at a time to a conveyor receiving area; a conveyor having a gripping area located to receive each article in succession from the singling device and to feed it in a feed direction; a measuring device disposed in the path of movement of each article having sensor means for measuring at least one of the parameters of height, length, thickness, weight, stiffness, and surface roughness information of each withdrawn article, for measuring the spacing distance between successive articles including the distance between an article last withdrawn and an article not yet withdrawn from the receiving area to said gripping area and for producing parameter signals representing each measurement made; a signal processing device electrically connected to said measuring device for receiving said parameter signals and generating output signals dependent on the respective parameter signals of the withdrawn article, said output signals representing a measure of the minimum distance to be maintained between the previously withdrawn article and the next article; and a control unit, connected to said signal processing device and connected to said singling device means for feeding articles one at a time, for receiving the output signals of said signal processing device, and for generating a control signal when the distance between the article last withdrawn and the article not yet withdrawn coincides with the minimum distance to be maintained, said control signal actuating the singling device means for feeding articles one at a time.

4. An arrangement according to claim 3, wherein the measuring device measures the article parameters of length, height, and thickness of the article last withdrawn.

5. An arrangement according to claim 3, wherein said conveyor moves at a velocity, said measuring device includes in said gripping area of the conveyor a light barrier having a light state and a dark state and said measuring device determining the length of the withdrawn article from the duration of the dark state of said light barrier and the transport velocty of said conveyor.

6. An arrangement according to claim 3, wherein said measuring device includes several light barriers having a light state and a dark state, mounted vertically above one another, to determine the height of the withdrawn article in the vertical direction, the height of the article being determined from the number of the light barriers in a dark state.

7. An arrangement according to claim 3, wherein said measuring device includes a spring-loaded plunger to detect the thickness of the withdrawn article, said plunger acting upon said conveyor, said conveyor including two conveyor belts the spacing of said conveyor belts depending upon the thickness of the article, the plunger position being responsive to the spacing of said conveyor belts.

8. An arrangement according to claim 7 wherein said conveyor moves at a velocity, the distance between the successive articles being measured by means of the light barriers, said light barriers having an output, the measuring device determining the distance between the withdrawn article and the article not yet withdrawn from the duration of the light state of the light barrier and the velocity of the conveyor.

9. An arrangement according to claim 8, wherein said signal processing device contains a decoder, said decoder furnishing, as a measure of the distance to the next article, said output signal as a function of the parameter signals received in accordance with the acquired article parameters.

10. An arrangement according to claim 9, wherein said signal processing device includes a processor for the length measurement having measuring clock generator whose output is connected to an input of an AND circuit; another input of the AND circuit being connected to the output of said light barrier; the leading edge of said article entering the light barrier area, starting the length measurement, an upcounter being set to zero by the leading edge of said article entering the light barrier, said upcounter being connected to said clock generator to count the number of said measuring clock generator pulses within the time interval of the dark state of the light barrier and to furnish the input value; and said decoder furnishing an output value to be selected for the distance to the next following article as a function of the input value furnished by the upcounter.

11. An arrangement according to claim 10, including another AND circuit connected to said light barrier and said clock generator said another AND circuit providing a signal to stop a count for a downcounter said measuring clock generator furnishing, via said another AND circuit, said signal to stop a count when the trailing edge of the article leaves the light barrier area, said output signal of the decoder presetting said downcounter; and wherein the momentary output value of said downcounter corresponds to the deviation of the distance of two successive articles from a preset value.

12. An arrangement according to claim 11, wherein said control unit furnishes a control signal when one of said downcounters furnishes a given output value.

13. An arrangement according to claim 12, wherein said control unit furnishes a control signal, when all of the downcounters furnish given output values.

14. An arrangement according to claim 13, wherein said control unit contains a number of comparators corresponding to the number of parameters to be determined; that the comparator outputs are connected to appropriate inputs of said another AND circuit, said comparators furnishing an output signal "HIGH" when the outputs of all downcounters are at "LOW"; and that the control unit furnishes an output signal for the start of the singling device means for feeding when the AND circuit emits a "HIGH" signal.

15. An arrangement according to claim 14, wherein said measuring device contains a target recognition device; said target recognition device determining in a succeeding distribution section a compartment in which the article is to be stacked; that the distribution section contains a plurality of directing switches; and the directing switches being controlled by the target recognition device.

16. An arrangement according to claim 15, wherein said target recognition device contains a bar code reader and the output signals of the bar code reader control the directing switches of the distribution section.

17. Arrangement according to claim 15, wherein a checking measuring device is disposed ahead of the distribution section; said checking measuring device acquires the parameters of the articles as well as the actual distances between consecutive articles, said checking and measuring device receiving from said target recognition device the information on the target compartments belonging to the articles; said checking and measuring device comparing the actual distance between consecutive articles with the set value resulting from the parameters (P), and that if the actual distance is less than the set distance by a given amount, the next article or the preceding article is steered into a catch compartment by the checking and measuring device by appropriately controlling the position of the switches.

18. An arrangement according to claim 17, wherein the checking measuring device acquires the parameters of the articles in the same manner as said measuring device, said checking measuring device furnishing therefrom the set value of the distance to the next article, said checking measuring device continuously acquiring the distances between consecutive articles; and that the checking and said measuring device, if the set value is fallen below, furnishes another control signal to reposition the directing switches so that the next article is steered into the catch compartment.

19. An arrangement according to claim 10, characterized in that said measuring device contains said light barrier including a plurality of light barrier units for the height measurement of the article, each individual light barrier unit being connected to the data inputs of another decoder contained in said signal processing device, the other said decoder furnishing an output value, to be selected dependent on the height of the article, for the distance to the next following article as a function of the number of light barrier units being in a dark state.

20. An arrangement according to claim 19, wherein said measuring clock generator is connected to the clock input of another downcounter via another AND circuit; that the output of said another decoder presets the other downcounter; and that the momentary output value of the other downcounter corresponds to the deviation of the distance (d) of the successive articles from the theoretical value.

21. An arrangement according to claim 20, wherein the measuring device includes another bank of light barriers for thickness measurement having a light and dark state to indicate the position of the spring-loaded plunger such that the thickness of the article located in the conveyor is indicated from the status of the light barriers, a third decoder receiving a signal representative of the thickness value said third decoder being positioned within the signal processing device and wherein said third decoder emits a value of the distance to the next following article to be selected as a function of the article thickness, a third downcounter receiving said value emitted by said third decoder to preset said third downcounter with this value; and that the measuring clock generator is connected to the clock input of the third downcounter via said another AND circuit.

* * * * *